Nov. 23, 1965  O. B. CRUSE  3,218,939

FRICTION DEVICE OPERATING MECHANISM

Filed April 26, 1962

INVENTOR
OLIVER B. CRUSE
BY
Gravely, Lieder &
Woodruff
ATTORNEYS

United States Patent Office 3,218,939
Patented Nov. 23, 1965

3,218,939
FRICTION DEVICE OPERATING MECHANISM
Oliver B. Cruse, Florissant, Mo., assignor to Wagner Electric Corporation, St. Louis, Mo., a corporation of Delaware
Filed Apr. 26, 1962, Ser. No. 190,464
2 Claims. (Cl. 92—63)

This invention relates to friction device operating mechanisms and in particular to safety means for preventing expulsion of spring powered emergency actuating means therefrom.

In the past, many friction device operating mechanisms have been provided with a service portion having service means therein for energizing a friction device in response to metered fluid pressure from the vehicle fluid pressure system and also with an emergency portion having emergency means therein powered by spring means for automatically energizing said friction device when the fluid pressure in said vehicle fluid pressure system was reduced below a predetermined value. The service and emergency portions were normally secured together by suitable securing means, such as a conventional clamping band, and an undesirable feature of such past friction device operating mechanisms was that upon releasing the securing means to disassemble said service and emergency portions, the spring means propelled said emergency portion from said service portion with great force. Of course, this undesirable feature resulted in many serious injuries to mechanics servicing the vehicle.

The principal object of the present invention is to provide a friction device operating mechanism incorporating safety means therein which overcome the aforementioned undesirable feature. This object and other objects and advantages will become more apparent hereinafter.

Briefly, the invention is embodied in a friction device operating mechanism including a service portion having service friction device actuating means therein, an emergency portion releasably engaged with said service portion and having emergency friction device actuating means therein powered by spring means, and means for permitting extension of said spring means to contain the force thereof within said emergency portion prior to releasing the engagement between said service and emergency portions.

Figure 1:
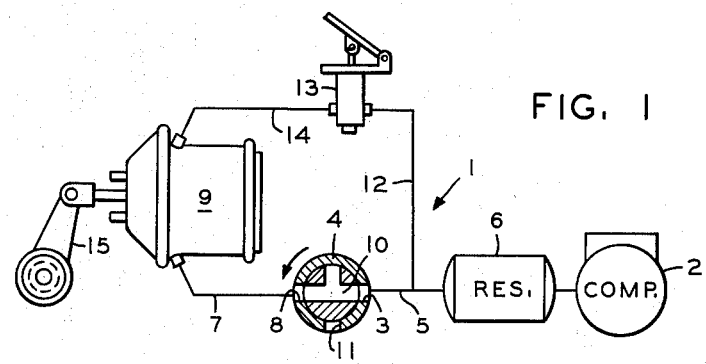
Figure 2:
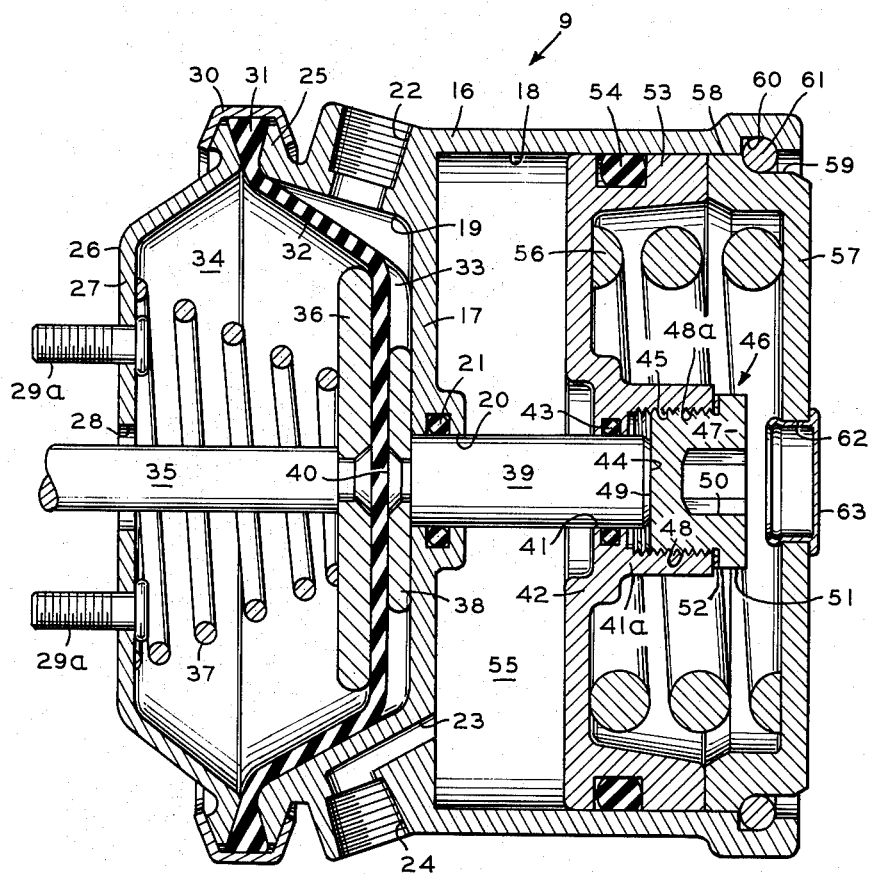

The invention also consists in the parts and arrangements and combinations of parts hereinafter described and claimed. In the accompanying drawings which form a part of the specification and wherein like numerals refer to like parts wherever they occur:

FIG. 1 is a diagrammatic view of an actuating system for a friction device with the friction device operating mechanism embodying the present invention shown therein, and FIG. 2 is a greatly enlarged cross-sectional view of the friction device operating mechanism shown in FIG. 1.

Referring now to FIG. 1 in detail, a friction device actuating system, indicated generally at 1, is provided with fluid pressure generating means, such as compressor 2, which is connected to the inlet 3 of a charging or control valve 4 by conduit 5 having a fluid pressure storage reservoir 6 interposed therein, and another conduit 7 is interposed between an outlet 8 of said charging valve and the emergency port of a friction device operating mechanism or actuating cylinder 9. The charging valve 4 is provided with passage means 10 connecting the inlet 3 in pressure fluid communication with the outlet 8; however, said charging valve can be rotated counterclockwise (in the direction of the arrow) positioning said passage means 10 to interrupt pressure fluid communication between said inlet and outlet and establish pressure fluid communication between said outlet and an exhaust port 11 to vent said outlet to atmosphere. A conduit 12 has one end intersecting with the conduit 5 and the other end thereof connecting with the inlet side of an application valve 13, and another conduit or service line 14 is interposed between the service or outlet side of said application valve and the service port of the actuating cylinder 9. To complete the system 1, the push rod of the actuating cylinder 9 is pivotally connected with linkage means or actuating lever, such as slack adjuster 15, for energizing a friction device (not shown).

The actuating cylinder 9 is provided with a cylinder or housing 16 having an annular wall 17 therein interposed between a bore 18 in the rightward end of said housing and a tapered bore 19 in the leftward end of said housing, and an aperture 20 having an O-ring 21 sealably disposed therein is centrally provided through the wall 17 between the bore 18 and tapered bore 19. A service port 22 which receives the conduit 14, as previously mentioned, is provided in the housing 16 connecting with the tapered bore 19, and a passage 23 has one end connecting with the bore 18 and the other end thereof intersecting with an emergency port 24 which receives the conduit 7, as previously mentioned. The housing 16 is provided with a peripheral flange 25 on the leftward end thereof, and an end plate housing 26 is provided with a concave or dish-shaped endwall 27 having a centrally located venting aperture 28 therein and a peripheral flange 29 positioned in opposed relation with the flange 25. The end plate housing 26 is also provided with a plurality of mounting studs 29a which are fixedly attached to the endwall 27 by suitable means, such as upset welding, said mounting studs being adapted for connection with a cooperating mounting bracket (not shown) adjacent the friction device.

A conventional clamping band 30 is positioned in clamping engagement with the opposed flanges 25 and 27, and the compressive force of said clamping engagement serves to maintain a peripheral bead 31 of a diaphragm 32 in sealable abutting engagement between said flanges 25 and 29. An actuating or service chamber 33 is formed in the tapered bore 19 between one side of the diaphragm 32 and the housing wall 17 in fluid pressure communication with the service port 22, and an atmospheric chamber 34 is formed between the other side of the diaphragm 32 and the end plate wall 27 connecting with the venting aperture 28. A push rod 35 extends coaxially through the venting aperture 28 having an exterior or working end pivotally connected with the slack adjuster 15, as previously mentioned, and an interior end fixedly connected by suitable means, such as staking, with an abutment plate or disc 36. The compressive force of a return spring 37 interposed between the end plate housing 26 and the abutment disc 36 serves to normally bias the push rod 35 to an inoperative position wherein the diaphragm 32 is abuttingly engaged between the abutment disc 36 and another abutment plate or disc 38 carried on an actuating shaft 39.

The actuating shaft 39 is slidably received in the aperture 20 of the housing wall 17 in sealable engagement with the O-ring 21, and the leftward or working end 40 thereof is positioned in the actuating chamber 33 with the abutment disc 38 fixedly connected thereon by suitable means, such as staking. The shaft 39 is also slidably received in a bore 41 provided in a centrally located hub portion 41a of an emergency piston 42 in sealable engagement with an O-ring 43 disposed in said bore 41, and the rightward or abutment end 44 of said shaft extends coaxially into a stepped bore 45 provided in the piston hub 41a in axial alignment with the bore 41. Removable spring release means, indicated generally at 46, is secured in the bore 45 and is provided with an abutment plug 47 having a peripheral threaded surface 48 which is cooperatively engaged with threads 48a provided in the bore 45.

The plug 47 is provided with an abutment surface 49 on the leftward or interior end thereof normally engaged with the abutment end 44 of the shaft and a hexagonally-shaped tool receiving recess 50 in the rightward or exterior end thereof. A radially outwardly extending head or flange 51 is integrally formed on the rightward end of the plug 47, and a lockwasher or gasket 52 is received on the plug peripheral surface 48 in locking engagement between the flange 51 and the rightward end of the emergency piston hub 41a.

The emergency piston 42 is provided with a peripheral sleeve portion 53 in sliding engagement with the housing bore 18, and an O-ring 54 carried in said sleeve portion is disposed in sealable engagement with said housing bore. An emergency chamber 55 is provided in the housing bore 18 between the housing wall 17 and the emergency piston 42 in open pressure fluid communication with the passage 23 and emergency port 24, and an emergency spring 56 is positioned in said housing bore between said emergency piston and a bore closure member 57. The bore closure member 57 is provided with a peripheral surface 58 in sliding and guiding engagement with the housing bore 18, and an annular recess 59 is provided in said surface. The housing bore 18 is also provided with an annular recess 60 adjacent the rightward end thereof, and a split lock or retaining ring 61 is positioned in said recess 60. The compressive force of the emergency spring 56 acting on the bore closure member 57 serves to bias the annular recess 59 thereof into abutting engagement with the retaining ring 61 in the housing bore recess 60 to retain said bore closure member against displacement from the housing bore 18. The bore closure member 57 is also provided with a centrally located access aperture 62 which is smaller than the abutment plug 48 to prevent expulsion of said abutment plug therethrough (to be discussed hereinafter). The access aperture 62 is also in axial alignment with the tool receiving recess 50 of the abutment plug 48, and a snap-on type button 63 is positioned in the aperture 62 to prevent the entry of foreign particles into the housing bore 18.

In the operation, assume that normal vehicle operating conditions exist wherein the storage reservoir 6 is charged with fluid pressure above a predetermined amount from the compressor 2 and wherein the reservoir 6 is connected in open fluid pressure communication with the emergency chamber 55 of the actuating cylinder 9 via the conduit 5, the inlet 3, passage means 10 and outlet 8 of the charging valve 4, the conduit 7, and the emergency port 24 and passage 23. The fluid pressure so transmitted to the emergency chamber 55 acts on the effective area of the emergency piston 42 creating an emergency force to position the emergency piston sleeve 53 in abutment with the closure member 57 and to overcome the compressive force of the emergency spring 56 maintaining said spring in its compressed position. With the component parts of the actuating cylinder 9 and system 1 positioned as above described and as shown in the drawing, the friction device (not shown) is de-energized.

If the operator desires to make a normal service application to energize the friction device and effect deceleration or a complete stop, a force is applied to actuate the application valve 13 and meter fluid pressure from the reservoir 6 through conduits 5 and 12, said application valve, the service line 14, and the service port 22 of the actuating cylinder 9 into the service chamber 33. The fluid pressure so established in the service chamber 33 acts on the effective area of the diaphragm 32 creating a service force to move said diaphragm, the plate 36 and push rod 35 leftwardly against the return spring 37 actuating the working end of said push rod to rotate the slack adjuster 15 and energize the friction device under normal operating conditions. When the applied force is removed from the application valve 13, the fluid pressure is exhausted to atmosphere from the service chamber 33 through the service port 22, the service line 14 and the exhaust port of the application valve 13 thereby eliminating the service force, and the compressive force of the return spring 37 subsequently moves the slack adjuster 15, the push rod 35 and plate 36, and the diaphragm 32 to their original positions.

In an emergency vehicle operating condition when the fluid pressure in the reservoir 6 is reduced below the predetermined value due to leaks in the system 1 or a non-producing compressor 2, or the like, the fluid pressure in the emergency chamber 55 is correspondingly reduced thereby reducing the emergency force opposing the compressive force of the spring 56. When the magnitude of the spring force overcomes that of the reduced emergency force, the emergency spring 56 moves the emergency piston 42 leftwardly in a work producing direction in the housing bore 18, and since the abutment end 44 of the shaft 39 is engaged with the abutment surface 49 of the plug 47, said shaft is concertly moved with said emergency piston to actuate the working end 40 thereof and effect simultaneous leftward movement of the plate 38, the diaphragm 32, the plate 36 and push rod 35 against the return spring 37 to pivot the slack adjuster 15 and energize the friction device under emergency operating conditions.

When the fluid pressure failure of the system 1 has been corrected and the fluid pressure in the reservoir 6 is increased to an amount greater than the predetermined value wherein normal operating conditions are now re-established, the fluid pressure in the emergency chamber 55 is correspondingly increased as well as the magnitude of the emergency force. When the magnitude of the emergency force overcomes that of the compressive force of the spring 56, the emergency piston 42 is moved rightwardly in the housing bore 18 to its original position in abutment with the closure member 57, and the compressive force of the return spring 37 effects rightward movement of the push rod 35 and plate 36, the diaphragm 32, and the plate 38 and shaft 39 to their original positions in follow-up relation with the emergency piston 42 thereby pivoting the slack adjuster 15 to de-energize the friction device.

The operator may initiate the emergency function of the actuating cylinder 9 to simulate emergency conditions or for vehicle pushing purposes, if he so desires, by "dynamiting" the system 1. To "dynamite" the system, the operator merely rotates the charging valve 4 in a counterclockwise direction (as shown by the arrow in FIG. 1) to align the passage means 10 between the charging valve outlet and exhaust port 8 and 11 thereby exhausting fluid pressure from the emergency chamber 55 of the actuating cylinder 9 through the passage 23 and emergency port 24 into the conduit 7 and therefrom via said outlet, passage means and exhaust port of the charging valve 4 to the atmosphere. With the emergency chamber 55 vented to atmosphere, the emergency function of the actuating cylinder 9 is initiated, as described hereinbefore, to energize the friction device.

In order to service the various component parts of the actuating cylinder which are subject to wear, it is necessary to disassemble the housing 18 from the housing 26 which, of course, is accomplished by removing the clamping band 30 from its clamping engagement with the housing peripheral flanges 25 and 29. If the fluid pressure in the emergency chamber is below the predetermined amount or has been "dynamited" when the clamping band 30 is removed, the compressive force of the emergency spring 56 would propel the housing 18 with great force from the housing 26, and as previously mentioned, this propelling force or effect can cause serious injuries to the person servicing the actuating cylinder. In order to obviate such a propelling effect, spring release means 48 are provided. Prior to the time that the clamping band 30 is removed from its clamping engagement with the housing peripheral flanges 25 and 29, the button 63 is removed from the closure member aperture 62 and a tool (not shown) is inserted therethrough into the plug recess 50.

A manual force is applied to the tool to rotate the plug 47 wherein the threaded engagement between the plug peripheral surface 48 and the threaded bore 45 effects axial rightward movement of said plug. This rightward movement initially overcomes the locking engagement between the plug head 51 and the piston hub 41a effected by the lockwasher 52, and further rightward movement of the plug 47 permits the emergency spring 56 to move the emergency piston 42 leftwardly independently of the shaft 39. When the plug 47 is completely removed from threaded engagement with the bore 45, the emergency spring 56 extends to move the emergency piston 42 relative to and independently of the shaft 39 into abutting engagement with the housing wall 17. As previously mentioned, the plug 47 is predeterminately larger than the access aperture 62 to prevent the possibility of said plug being propelled therethrough and injuring the person servicing the actuating cylinder 9. With the emergency piston 42 biased into engagement with the wall 17 by the emergency spring 56, the compressive force thereof is positively contained between the wall 17 and the closure member 57 and aforementioned propelling force or effect of said emergency spring is obviated; therefore, the clamping band 30 can be removed to separate housings 18 and 26 and service the component parts of the actuating cylinder.

Further, when the propelling effect is obviated by the positive containment of the emergency spring 56, as above described, a press (not shown), or similar device, can be utilized to move the closure member 57 for a short distance in the housing bore 18 against the relatively weak compressive force of the extended emergency spring 56 to remove the lock ring 61 and subsequently disassemble the component parts of the actuating cylinder 9 in the housing bore 18 for servicing purposes.

It is now apparent that a novel friction device operating mechanism or actuating cylinder meeting the objects set out hereinbefore is provided and that changes and modifications in the disclosure may be made by those skilled in the art without departing from the spirit of the invention as defined by the claims which follow.

What I claim is:

1. A friction device operating mechanism comprising a cylinder having opposed end walls, piston means slidable in said cylinder and defining with one of said end walls an expansible fluid pressure chamber and with the other of said end walls an expansible spring chamber, a shaft slidably mounted on said piston means and said one end wall and having a work end extending exteriorly of said cylinder, spring means engaged between said piston means and said other end walls, and threaded means removably secured to said piston means and normally in driving engagement with said shaft, said spring means serving to concertedly move said piston means and shaft to actuate the working end thereof in response to fluid pressure in said chamber less than a predetermined value, said threaded means being adapted for complete removal from said piston means and driving engagement with said shaft to provide unrestricted relative movement of said piston means independently of said shaft into engagement with said one end wall wherein the compressive force of said spring means is positively contained between said end walls, and said threaded means being contained within said spring chamber and accessible through a relatively small access opening in said other end wall to prevent expulsion of said threaded means upon complete removal from said piston means.

2. A friction device operating mechanism comprising a housing having a wall therein, a end plate, removable securing means positioned in interconnecting engagement between said housing and end plate, diaphragm means sealably secured between said housing and end plate and with one side of said wall defining a service chamber in said housing, said diaphragm means including operating linkage means extending exteriorly of said end plate for operative connection with a friction device, a bore in said housing extending from the other side of said wall, a closure member slidable in said bore of said housing toward said wall and forming one end wall of said bore, removable retaining means engaged in said housing bore and maintaining said closure member therein, piston means slidable in said housing bore and with the other side of said wall defining an expansible emergency fluid pressure chamber in said housing bore, said piston means and said closure member denfining an expansible spring chamber therebetween, an emergency spring in said spring chamber and biased between said piston means and said closure member in opposition to fluid pressure expansion of said chamber, a bore in said wall, another bore in said piston means in axial alignment with said wall bore, a shaft reciprocally mounted in said wall bore, said shaft having a working end in said service chamber for operative engagement with said diaphragm and an abutment end extending into said piston means bore, an abutment plug threadedly engaged in said piston means bore for normally maintaining a fixed driving engagement of the abutment end of said shaft with said abutment plug, means for introducing fluid pressure into said emergency chamber, said piston means being movable toward an inoperative position against the corpressive force of said emergency spring in response to fluid pressure in said emergency chamber in excess of a predetermined value, resilient means normally urging said diaphragm means to an inoperative position toward engagement with the working end of said shaft, said emergency spring being extendable to effect concert movement of said piston means, said shaft and said diaphragm means toward an operative position to mechanically actuate said linkage means when the fluid pressure in said emergency chamber is less than the predetermined value, said abutment plug being contained within said spring chamber, an access aperture in said closure member for tool insertion purposes to completely remove said abutment plug from threaded engagement with said piston means bore and from driving engagement with the abutment end of said shaft and to permit unrestricted relative movement between said shaft and piston, said access aperture being smaller than said abutment plug to prevent expulsion of the latter from said spring chamber upon its complete removal from said piston means bore, said emergency spring being further extendable to move said piston means relative to said shaft to a fully disabled position in abutment with said wall upon complete removal of said abutment plug from driving engagement with the abutment end of said shaft wherein the compressive force of said emergency spring is contained between said piston means in abutting engagement with said wall and said closure member to obviate expulsion of said housing from said end plate upon the subsequent removal of said removable securing means from interconnecting engagement from said housing and said end plate.

References Cited by the Examiner
UNITED STATES PATENTS 3,107,583   10/1963   Woodward _____ 92—63

ARTHUR L. LA POINT, *Primary Examiner.*

EUGENE G. BOTZ, *Examiner.*